(12) United States Patent
Renfors et al.

(10) Patent No.: US 7,936,851 B2
(45) Date of Patent: May 3, 2011

(54) CHANNEL EQUALIZATION

(75) Inventors: Markku Renfors, Tampere (FI); Tero Ihalainen, Nokia (FI); Tobias Hidalgo Stitz, Tampere (FI)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 10/590,039

(22) PCT Filed: Feb. 20, 2004

(86) PCT No.: PCT/IB2004/000439
§ 371 (c)(1),
(2), (4) Date: Aug. 2, 2007

(87) PCT Pub. No.: WO2005/091583
PCT Pub. Date: Sep. 29, 2005

(65) Prior Publication Data
US 2008/0043827 A1 Feb. 21, 2008

(51) Int. Cl.
*H03D 1/04* (2006.01)
(52) U.S. Cl. ...................................... 375/346
(58) Field of Classification Search .................. 370/465; 375/232, 260, 316, 346; 379/28, 398
See application file for complete search history.

(56) References Cited

U.S. PATENT DOCUMENTS

| | | | | |
|---|---|---|---|---|
| 4,270,179 A | * | 5/1981 | Sifford et al. | 708/422 |
| 5,555,285 A | * | 9/1996 | Tapia et al. | 379/28 |
| 5,559,835 A | * | 9/1996 | Betts | 375/265 |
| 5,809,074 A | | 9/1998 | Werner et al. | |
| 5,835,731 A | | 11/1998 | Werner et al. | |
| 5,900,778 A | * | 5/1999 | Stonick et al. | 330/149 |
| 5,940,440 A | | 8/1999 | Werner et al. | |
| 6,075,816 A | | 6/2000 | Werner et al. | |
| 2003/0067997 A1 | | 4/2003 | Kintis et al. | |
| 2003/0215028 A1 | * | 11/2003 | Hammes et al. | 375/316 |
| 2003/0224751 A1 | * | 12/2003 | Vanderhelm et al. | 455/296 |
| 2004/0008618 A1 | | 1/2004 | Shirakata et al. | |
| 2004/0042557 A1 | * | 3/2004 | Kabel et al. | 375/260 |
| 2006/0209881 A1 | * | 9/2006 | Howard | 370/465 |

FOREIGN PATENT DOCUMENTS

TW 348344 12/1998

(Continued)

OTHER PUBLICATIONS

Regalia et al ("The Digital All-Pass Filter: A Versatile Signal Processing Building Block", Proceedings of the IEEE, vol. 76, No. 1, Jan. 1988, pp. 19-37).*

(Continued)

*Primary Examiner* — David C Payne
*Assistant Examiner* — Leon-Viet Q Nguyen

(57) ABSTRACT

A method for use in an equalization of a channel by means of an equalizer 22, 23 is shown, wherein the channel uses a certain frequency band for a transfer of signals. In order to enable a channel equalization which requires a low complexity and which provides at the same time a good performance, the method determines a channel response for at least one frequency point within the frequency band used by the channel. The method further sets at least one adjustable coefficient ($\phi_{0k}$, $b_{ck}$, $b_{rk}$, $a_{0k}$, $a_{1k}$, $a_{2k}$) of the equalizer such that an equalizer response compensates optimally the determined channel response at the at least one selected frequency point. Also shown is a corresponding signal processing device 2, a corresponding signal processing system and a corresponding software program product.

25 Claims, 4 Drawing Sheets

FOREIGN PATENT DOCUMENTS

| | | |
|---|---|---|
| TW | 359934 | 6/1999 |
| TW | 362313 | 6/1999 |
| TW | 367662 | 8/1999 |
| WO | 2004/059935 | 7/2004 |

OTHER PUBLICATIONS

Alhava ("Time-Domain Equalizer for Filter Bank-Based Multicarrier Communications", 2002 IEEE, pp. 184-188).*

"The Digital All-Pass Filter: A Versatile Signal Processing Building Block" by Phillip A. Regalia, et al; Proceedings of the IEEE, vol. 76, No. 1, Jan. 1988, pp. 19-37, New York, NY.

Summons to Attend Oral Proceedings Pursuant to Rule 115(1) EPC (Application No. 04713135.4-2415) dated Feb. 1, 2008, Form 2008 (1 page) and Form 2906 (7 pages).

"On the Performance of filter Bank Based Multicarrier Systems in xDSL and WLAN Applications" by T. Ihalainen et al, $7^{th}$ International OFDM Workshop 2002, Sep. 11, 2002, pp. 1120-1124.

"Techniques for Acquiring and Tracking MIL-STD 181B Signals" by M. Nezami; Military Communications Conf., Milcom 2002, Proceedings, Anaheim, CA Oct. 7-10, 2002; IEEE Military Communications Conf., New York, NY: IEEE, U.S. vol. 1 of 2, Oct. 7, 2002, pp. 224-231.

"An Analysis of Automatic Equalizers for Orthogonally Multiplexed QAM Systems" by B. Hirosaki, IEEE Trans. Commun., vol. 28, Jan. 1980, pp. 73-83.

"Frequency Domain Equalization for Single-Carrier Broadband Wireless Systems" by D. Falconer et al; IEEE Communications Magazine, vol. 40, No. 4, Apr. 2002, pp. 58-66.

"An Unified Approach to Equalization and Echo Cancellation in OQAM-based Multi-Carrier Data Transmission" by S. Nedic; 1997 IEEE, pp. 1519-1523.

"Time-Domain Equalizer for Filter Bank-Based Multicarrier Communications" by J. Alhava, 2002 IEEE, pp. 184-188.

"Adaptive Sine-Modulated/Cosine-Modulated Filter Bank Equalizer for Transmultiplexers" by J. Alhava et al; ECCTD'01-European Conference on Circuit Theory and Design, Aug. 28-31, 2001, Espoo, Finland, pp. III-337-III340.

"Oversampled Cosine Modulated Filter Banks with Perfect Reconstruction" by H. Bolcskei et al; IEEE Transactions on Circuits and Systems-II: Analog and Digital Signal Processing, vol. 45, No. 8, Aug. 1998.

"On the Performance of Low-Complexity Ascet-Equalizer for a Complex Transmultiplexer in Wireless Mobile Channel" by T. Ihalainen, et al; Proc. $7^{th}$ Int. OFDM-Workshop 2002, Harburg, Germany, pp. 122-126, Sep. 2002.

"A Computationally Efficient Method of Timing and Phase Estimation in TDMA Systems Using a Preamble Sequence" by G. Bolding et al; International Journal of Satellite Communications, vol. 13, 441-452 (1995).

"On Channel Equalization in filter Bank Based Multicarrier Wireless Access Systems" by Markku Renfors et al, 1999 IEEE, pp. 228-232.

"Fractionally Spaced Linear and Decision-Feedback Detectors for Transmultiplexers" by Luc Vandendorpe et al, 1998 IEEE, pp. 996-1011.

"Overlapped Discrete Multitone Modulation for High Speed Copper Wire Communications" by Stuart D. Sandberg et al, 1995 IEEE, pp. 1571-1585.

OFDM Basics, Chapter 2 of "OFDM Wireless Multimedia Communications", by R. von Nee et al, Artech House, London 2000, pp. 33-51.

English translation of Taiwan Search Report completed Oct. 11, 2010 in parallel Taiwan application No. 094104581 (1 page).

Taiwan Office Action (3 pages) and Search Report (1 page) completed Oct. 11, 2010 in parallel Taiwan application No. 094104581, 4 pages total.

English Abstract of Taiwan Patent Publication No. 367662, published Aug. 21, 1999, Lucent Technologies Inc US (1 page).

English Abstract of Taiwan Patent Publication No. 362313, published Jun. 21, 1999, Lucent Technologies Inc US (1 page).

English Abstract of Taiwan Patent Publication No. 359934, published Jun. 1, 1999, Lucent Technologies Inc US (1 page).

English Abstract of Taiwan Patent Publication No. 348344, published Dec. 21, 1998, Lucent Technologies Inc US (1 page).

* cited by examiner

CHANNEL EQUALIZATION

CROSS-REFERENCE TO RELATED APPLICATION

This is the U.S. National Stage of International Application Number PCT/IB2004/000439 filed Feb. 20, 2004 and published in English on Sep. 29, 2005 as International Publication Number WO 2005/091583 A1.

FIELD OF THE INVENTION

The invention relates to method for use in an equalization of a channel by means of an equalizer, wherein the channel uses a certain frequency band for a transfer of signals. The invention relates equally to a corresponding signal processing device, to a corresponding signal processing system and to a corresponding software program product.

BACKGROUND OF THE INVENTION

Processing signals comprises in a variety of systems a channel equalization. A channel equalization is employed for compensating the effects of a fading multipath channel, which constitute a fundamental problem in communication systems.

Various channel equalization techniques have been developed for the traditional single-carrier transmission systems and more recent CDMA systems. With increasing data rates and signal bandwidths in new and future systems, there is moreover an increasing interest in multicarrier transmission techniques, for which dedicated channel equalization techniques have to be employed. In a multicarrier transmission system, a transmitted higher-rate data stream is divided into a number of lower-rate sub-channels partly overlapping in the frequency domain. For multiplexing and demultiplexing these sub-channels, various techniques are known, for instance orthogonal Frequency Division Multiplexing (OFDM) techniques and Filter Bank based Multicarrier (FBMC) techniques. FBMC techniques are sometimes also referred to as Discrete Wavelet Multitone (DWMT) techniques.

OFDM has been described for example by R. van Nee and R. Prasad in chapter 2 "OFDM basics" of the document "OFDM Wireless Multimedia Communications", Artech House, London, 2000. In an OFDM system and its baseband version Discrete Multitone (DMT), a high-rate data stream is split into a number of lower rate streams that are transmitted simultaneously over a number of sub-carriers, in order to decrease the relative amount of dispersion in time caused by multipath delay spread. The sub-channels are multiplexed and demultiplexed by means of an IFFT-FFT (Inverse Fast Fourier Transform/Fast Fourier Transform) pair. In OFDM and DMT systems, a time-domain guard interval introduced for every OFDM symbol and a simple 1-tap frequency domain equalization is commonly used for channel equalization. In the guard time, the OFDM symbol is cyclically extended to avoid inter-carrier-interference.

OFDM and DMT systems are very robust from a channel equalization point of view. On the other hand, there are certain advantages that can be obtained by using an FBMC system instead of an IFFT-FFT pair, as will be explained in the following.

An FBMC system has been presented for example by T. Ihalainen, Tobias Hidalgo-Stitz and Markku Renfors in: "On the performance of low-complexity ASCET-equalizer for a complex transmultiplexer in wireless mobile channel" in Proc. 7th Int. OFDM-Workshop 2002, Harburg, Germany, pp. 122-126, September 2002.

FIG. 1 is a block diagram of a $0^{th}$ order ASCET (Adaptive sine-modulated/cosine-modulated filter bank equalizers for transmultiplexers) equalizer structure for complex systems, which was taken from the above cited document "On the performance of low-complexity ASCET-equalizer for a complex transmultiplexer in wireless mobile channel". The system comprises a transmitting end and a receiving end, between which a multicarrier radio communication is to be enabled.

In order to achieve a good spectral efficiency in radio communications, it is necessary to have a complex I/Q baseband model for the FBMC system. The equalizer structure of FIG. 1 therefore comprises at the transmitting end a synthesis bank for converting 2M real low-rate sub-channel signals for transmission into a complex I/Q (In phase/Quadrature) presentation of a high-rate channel signal. The sampling rate conversion factor is M. The synthesis filter bank includes a cosine modulated filter bank (CMFB) 10, in which sub-filters are formed by modulating a real low-pass prototype filter with a cosine sequence. The cosine-modulation translates the frequency response of the prototype filter around a new center frequency. The synthesis filter bank moreover comprises a sine modulated filter bank (SMFB) 11, in which corresponding sub-filters are formed by modulating a real low-pass prototype filter with a sine sequence.

The equalizer structure further comprises at the receiving end an analysis bank for converting a received high-rate channel signal into low rate sub-channel signals again. A complex critically sampled perfect reconstruction (PR) analysis bank would equally include a corresponding CMFB and a corresponding SMFB, which take the real part of the signal after the complex sub-channel filtering. The prototype filter can be optimized in such a manner that the filter bank satisfies the PR condition, i.e. the analysis transform is invertible by the synthesis transform. In the structure of FIG. 1, however, the analysis bank implements a filter bank with complex output signals instead of real output signals by employing two CMFBs 12, 14 and two SMFBs 13, 15. This way, oversampled sub-channel signals can be obtained for enabling a channel equalization.

The exact equations realized by the CMFBs 10, 12, 14 and the SMFBs 11, 13, 15 can be taken from the above cited document "On the performance of low-complexity ASCET-equalizer for a complex transmultiplexer in wireless mobile channel".

For a transmission, 2M low-rate symbol sequences, which are to be transmitted on respective sub-channels, are fed to the synthesis filter bank of the transmitting end, half of them corresponding to sub-channels between 0 and $f_s/2$, and the other half corresponding to sub-channels between 0 and $-f_s/2$, where $f_s$ is the high sampling rate. More specifically, the sum of a respective pair of symbols $I_k(m)$ and $I_{2M-1-k}(m)$, where k=0, 1, . . . , M−1, is divided by two and fed to the CMFB 10, while the difference between the respective pair of symbols $I_k(m)$ and $I_{2M-1-k}(m)$ is divided by two and fed to the SMFB 11. In the notation $I_k(m)$ and $I_{2M-1-k}(m)$, the indices k and 2M-1-k indicate the respective sub-channel, while the parameter m is a time index. The output of the SMFB 11 is multiplied by j and then combined with the output of the CMFB 10 in order to form a complex I/Q channel signal for transmission. The multiplication by j means that the signal output by the SMFB 11 is used as the quadrature component in the subsequent processing. The units required for the described processing at the transmitting end, including summing means, multiplication means, the CMBF 10 and the SMBF 11, will also be referred to as synthesis portion 20, which is indicated in FIG. 1 by a first rectangle with dashed lines.

The radio channel used for transmission is equivalent to a low-pass channel $H_{1p}(z)$.

At the receiving end, the high-rate channel signal is separated again into a real part Re{.} and an imaginary part Im{.}, the real part Re{.} being fed to the first CMFB 12 and the first SMFB 13 of the analysis bank, and the imaginary part Im{.} being fed to the second CMFB 14 and the second SMFB 15 of the analysis bank. Each of the CMFBs 12, 14 and the SMFBs 13, 15 outputs M signals via M sub-filters.

Each output signal of the second SMFB 15 is added to the corresponding output signal of the first CMFB 12, resulting in a first group of signals, which constitute an in-phase component I of the first M sub-channel signals. Each output of the first SMFB 13 is subtracted from the corresponding output of the second CMFB 14, resulting in a second group of signals, which constitute a quadrature component Q of the first M sub-channel signals. Each output of the first SMFB 13 is added to the corresponding output of the second CMFB 14, resulting in a third group of signals, which constitute a quadrature component Q of the second M sub-channel signals. Each output of the second SMFB 15 is subtracted from the corresponding output of the first CMFB 12, resulting in a fourth group of signals, which constitute an in-phase component I of the second M sub-channel signals. The units required for the processing at the receiving end described so far, including separation means, the CMBFs 12, 14, the SMBFs 13, 15 and summing means, will also be referred to as analysis portion 21, which is indicated in FIG. 1 by a second rectangle with dashed lines.

For channel equalization, a dedicated single real coefficient $c_k$, $s_k$, $c_{2M-1-k}$, $s_{2M-1-k}$ is then used for weighting the in-phase component I and the quadrature component Q of each sub-channel signal in order to adjust the amplitude and phase of each sub-channel by a simple multiplication. The indices k, 2M-1-k indicate the sub-channel to which the respective coefficient is associated. The coefficients $c_k$, $s_k$, $c_{2M-1-k}$, $s_{2M-1-k}$ provided for a sub-channel are preferably related to the channel response within the corresponding sub-channel bandwidth.

It is mentioned in the above cited document "On the performance of low-complexity ASCET-equalizer for a complex transmultiplexer in wireless mobile channel" that such a constant coefficient works well only in the case when the frequency response is rather flat within each sub-channel bandwidth, which may require a relatively high number of sub-channels. It is further indicated that higher-order ASCETs may be obtained by including low-order Finite Impulse Response (FIR) filter stages for each of the sub-channels. Such an approach, in which FIR filters are used as equalizers which are adjusted using common adaptation algorithms and criteria, like a mean-squared error criterion, has been described for example by B. Hirosaki in "An analysis of automatic equalizers for orthogonally multiplexed QAM systems", IEEE Trans. Commun., vol. 28, pp. 73-83, January 1980.

The real parts of corresponding weighted signals of the first and the second group of sub-channel signals are then taken at a respective unit 16 provided to this end and subjected to a respective decision device 18, a so called slicer, in order to obtain the first M real sub-channel symbol sequences $\hat{I}_k(m)$. The real parts of corresponding weighted signals of the third and the fourth group of sub-channel signals are equally taken at a respective unit 17 provided to this end and subjected to a respective slicer 19, in order to obtain the second M real sub-channel symbol sequences $\hat{I}_{2M-1-k}(m)$.

The main characteristic of FBMC systems is that the sub-channels can be designed optimally in the frequency domain, e.g. to have good spectral containment. There are certain advantages that can be obtained by using filter banks with highly frequency selective sub-channels in the transmultiplexer configuration instead of an IFFT-FFT pair, as in the case of OFDM and DMT systems.

Firstly, the bank selectivity is a design parameter for precise spectrum control. This provides resistance against narrowband interference and allows the use of very narrow guard bands around the multicarrier signal. Secondly, the guard period applied in OFDM-systems to combat inter-symbol-interference (ISI) becomes unnecessary. Reducing the frequency-domain guard-band and avoiding the time-domain guard interval saves significant amount of bandwidth for data transmission, thus improving the spectral efficiency. Furthermore, an FBMC system with a proper channel equalization allows the use of a considerably lower number of sub-carriers than the OFDM techniques. This helps to reduce the problems in OFDM which are due to a high peak-to-average power ratio. Being able to use fewer sub-channels to cover the user signal band helps to reduce the latency of the transmission link, improves the performance in case of time-selective channels due to a reduced symbol length, reduces the sensitivity to Doppler effects, frequency errors and phase noise, and gives more freedom in choosing the essential system parameters.

However, the known channel equalization solutions for FBMC systems, in which case the guard-interval approach cannot be used, suffer from insufficient performance, as in the case of the presented $0^{th}$ order ASCET and/or from relatively high implementation complexity, as in the case of an FIR based approach.

Another structure using a filter bank system which relies on an efficient sub-band processing is the analysis-synthesis (AS) filter bank configuration. In an AS configuration, which can be employed for various coding and adaptive signal processing applications, the signal frequency band is divided in an analysis bank into a number of overlapping sub-bands for processing, and after processing the signal is restored in a synthesis bank by combining the sub-band signals again. In perfect-reconstruction systems, the filter bank design is such that the original signal can be restored completely, if no processing is done in between. In most applications, the system performance can be improved by increasing the number of sub-bands. However, increasing the number of sub-bands increases the implementation complexity, as well as the processing latency due to the filter banks. The use of the AS configuration in channel equalization in single-carrier systems has been dealt with for example by D. Falconer et al. in "Frequency domain equalization for single-carrier broadband wireless systems", IEEE Communications Magazine, vol. 40, no. 4, April 2002, pp. 58-66.

In order to avoid the above mentioned problems, it has been proposed for a filter-bank based signal processing system in general to process oversampled lower-rate sub-channel signals with a polynomial model of a system frequency response within the frequency range of the respective sub-channel. The polynomial model may comprise in particular an amplitude response model and a phase response model for each sub-channel. A filter structure may then comprise an amplitude equalizer using the amplitude response model for processing a respective sub-channel and an allpass filter using the phase response model for processing a respective sub-channel.

The use of a polynomial frequency response model for a channel equalization allows to approximate the ideal frequency response model with a good performance using a considerably lower number of sub-bands than a $0^{th}$ order equalizer, in which amplitude and phase are assumed to be constant within each sub-band. In comparison to other FBMC approaches with higher-order equalizers, like in the above mentioned document "An analysis of automatic equalizers for orthogonally multiplexed QAM systems", using a low-order polynomial frequency response model for an equalizer reduces the complexity and/or improves the performance of the channel estimation by reducing the number of parameters that are to be estimated. In case of a direct adaptive equalization, the approach moreover improves the convergence speed. The approach using a polynomial frequency response model thus provides in general a better tradeoff between performance and complexity than the conventional channel equalization methods for FBMC systems. Simulation results indicate that by using a piece-wise linearly frequency dependent model for the channel frequency response in the channel equalization along with the mentioned equalizer structure, a considerable reduction in the number of sub-channels of up to a factor of about 10 is possible in comparison to the basic OFDM systems.

Nevertheless, some effort is required in this approach for determining the polynomial frequency response model for each sub-channel.

SUMMARY OF THE INVENTION

It is an object of the invention to enable a channel equalization which requires a low complexity and which provides at the same time a good performance. It is in particular an object of the invention to simplify the determination of adjustable coefficients of an equalizer used for a channel equalization.

A method for use in an equalization of a channel by means of an equalizer is proposed, wherein the channel uses a certain frequency band for a transfer of signals. The proposed method comprises determining a channel response for at least one frequency point within the frequency band used by the channel. Moreover, the proposed method comprises setting at least one adjustable coefficient of the equalizer such that an equalizer response compensates optimally the determined channel response at the at least one frequency point.

In addition, a signal processing device is proposed, which comprises at least one equalizer associated to a channel using a certain frequency band for a transfer of signals. The at least one equalizer comprises at least one adjustable coefficient. The proposed device further comprises a channel estimation component. The channel estimation component is adapted to determine for at least one channel to which the at least one equalizer is associated a channel response for at least one frequency point within a frequency band used by the at least one channel. The channel estimation component is moreover adapted to set at least one adjustable coefficient of the at least one equalizer such that an equalizer response compensates optimally the determined channel response at the at least one selected frequency point.

Further, a signaling processing system is proposed, which comprises at least the proposed signaling processing device.

Finally, a software program product is proposed, in which a software code for use in an equalization of a channel by means of an equalizer is stored. The channel uses a certain frequency band for a transfer of signals. When running in a signal processing device comprising the equalizer, the software code realizes the steps of the proposed method.

The invention proceeds from the consideration that modeling a channel frequency response for compensating distortions in a channel is a rather complex task, even if a low-order polynomial model is used. It is therefore proposed that a channel equalizer comprises adjustable coefficients which are set such that the equalizer equalizes the channel optimally at certain frequency points within the frequency band used by the channel. The coefficients are selected by comparing the channel response at these frequency points with the equalizer response at these frequency points.

The invention provides the same advantages as the above mentioned approach using a polynomial model of a system frequency response.

The invention has further the advantage that it does not require a polynomial frequency response modeling. The coefficients of an equalizer which are optimal for some frequency points can be determined by a few, simple calculations from the channel response for these frequency points.

As channel response for a specific channel, for example the channel phase response and the channel amplitude response may be determined. The coefficients of the equalizer may then be set such that the equalizer amplitude response approaches optimally the inverse of the determined channel amplitude response for all considered frequency points and that an equalizer phase response approaches optimally the negative of the determined channel phase response for all considered frequency points.

What can be achieved as optimal approach between the channel response and the equalizer response depends on the equalizer structure and the selected frequency points. The optimal approaching may thus constitute a zero-forcing, that is, the coefficients are set such that the achieved equalizer response compensates the channel response exactly at the predetermined frequency points. If such an exact compensation is not possible, however, other criteria can be used as well. For instance, a mean squared error (MSE) criterion could be applied directly instead, which ensures that the MSE for all considered frequency points is minimized. Such an approach could provide for example an improved performance for those channels that contain deep notches in the frequency response.

The computational complexity and power consumption depends on the complexity of the employed equalizer structure, which depends in turn on the number of the frequency points to be considered. Therefore, the number of frequency points is advantageously not fixed but determined individually for each channel, for example data block-wise based on the frequency domain channel estimates. This allows to use always the simplest equalizer structure providing a sufficient performance.

Particularly simple equalizer structures can be achieved, if the to be considered frequency points are set to the center frequency of the channel, to both edges of the frequency band used by the channel, or to both. Additional frequency points may be considered for improving the performance with a somewhat increased complexity. The equalizer may then comprise, depending on the number of selected frequency points, one or more of a a phase rotator part having a complex coefficient, a complex allpass filter part and a real allpass filter part for the phase equalization, and an FIR filter part for the amplitude equalization.

The invention can be employed for supporting a channel equalization in various types of devices and systems. It can be used for instance for a channel equalization in a single-carrier system or for a sub-channel equalization in a multi-carrier system, like an FBMC system or a transform based multicarrier system. The latter could be given for instance by an OFDM type of system.

The invention is also applicable to filter bank based multi-antenna systems in a Multiple Input Multiple Output (MIMO) configuration, which are used for instance in wireless communication systems. In such an application, frequency independent MIMO solutions can be obtained for each particular frequency, for example by inverting the channel matrix. It is proposed that in this case, a K×L matrix of equalizers adjusted in accordance with the invention is used for each sub-channel, where K is the number of transmit antennas and L is the number of receive antennas. Each equalizer is then designed to match the frequency independent MIMO solutions at the considered frequency points. The equalizer matrix ensures a smooth frequency-dependant MIMO processing for the frequencies between the considered frequency points. The potential benefits of MIMO-FBMC systems over MIMO-OFDM systems, which have been widely studied, are similar to those in the conventional Single Input Single Output (SISO) case described above.

The invention can also be employed in a frequency-domain equalized single-carrier system using an analysis-synthesis filter bank configuration and oversampled subband processing employing the proposed method.

The method of the invention can be realized for instance with a signal processing algorithm, for example a channel equalization algorithm. Such an algorithm can be implemented for example as a digital Very Large Scale Integration (VLSI) circuit or by using a Digital Signal Processing (DSP) processor.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
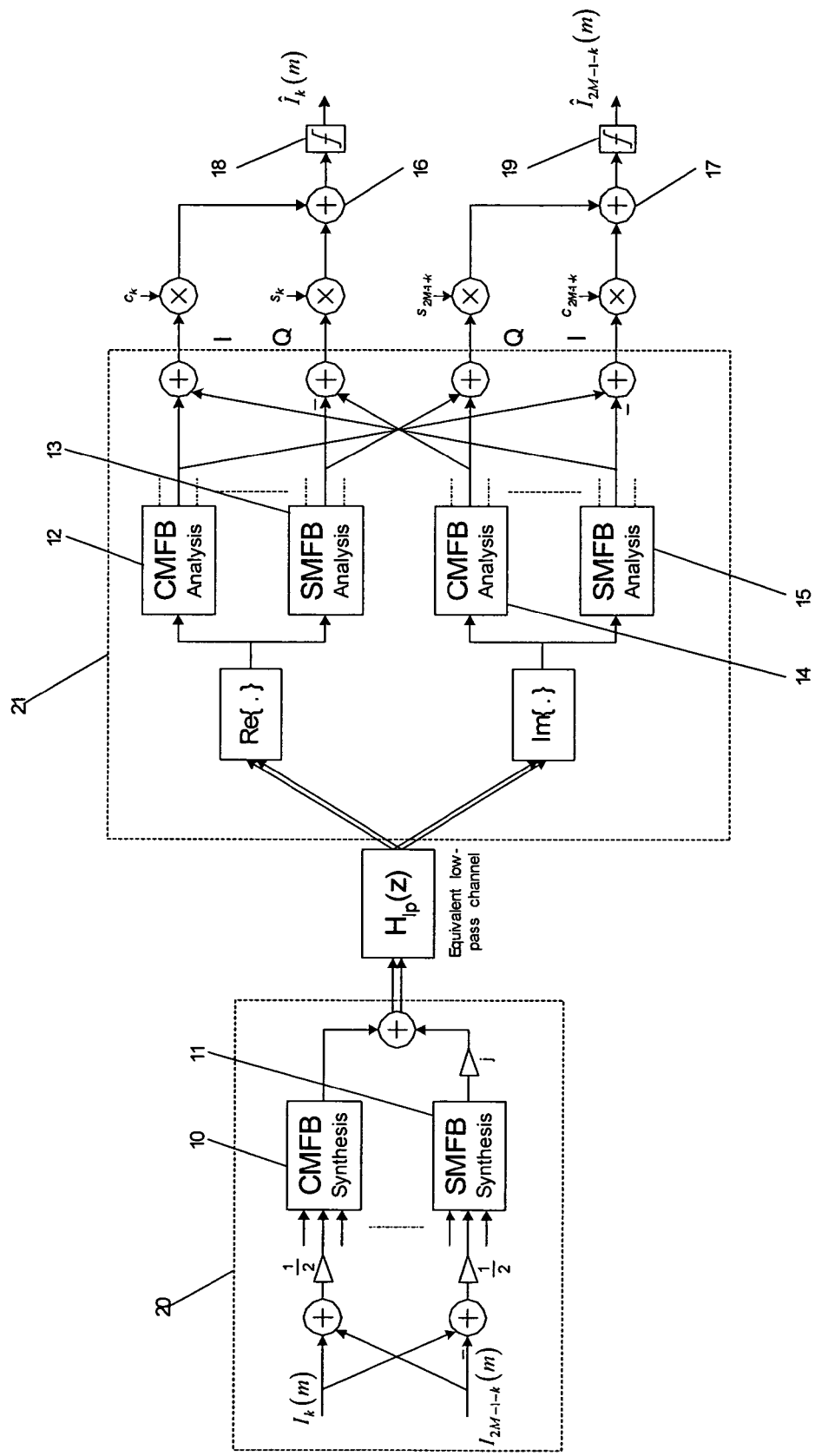
FIG. 1 is a block diagram of a known $0^{th}$ order ASCET equalizer structure.

The system illustrated in FIG. 1 was already described above. An embodiment of the system according to the invention, which is an enhancement of the system of FIG. 1, will now be described with reference to FIG. 2.

Figure 2:
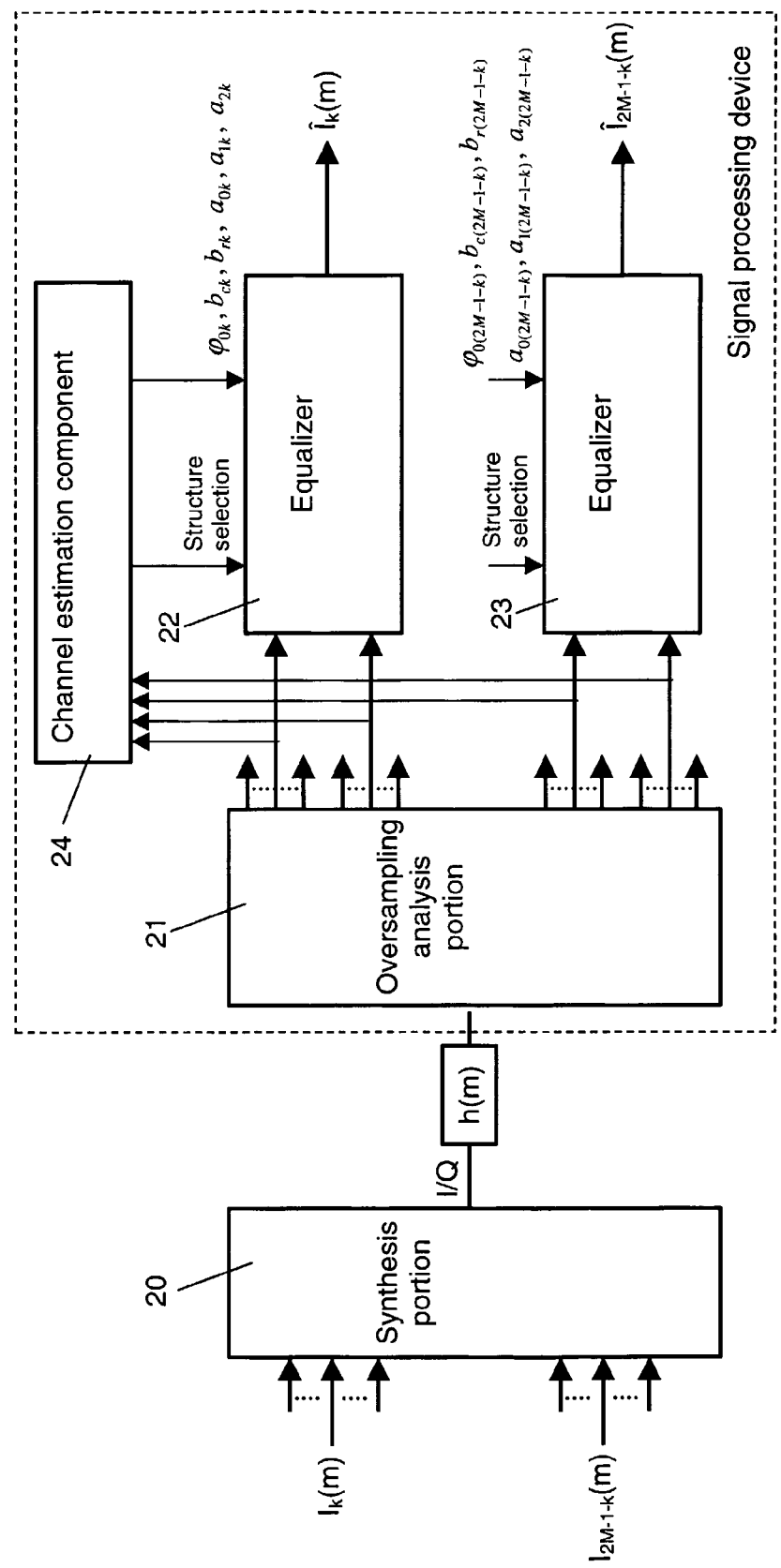
FIG. 2 is a schematic block diagram of a system according to an embodiment of the invention.

The system of FIG. 2 comprises a transmitter and a receiver between which multicarrier signals are to be transmitted via the radio interface. The system of FIG. 2 utilizes to this end a filter bank structure which is based on sine-modulated and cosine-modulated filter bank sections in a transmultiplexer configuration. The equalization scheme realized in this embodiment is called AP-ASCET (Amplitude-Phase Adaptive sine-modulated/cosine-modulated filter bank equalizers for transmultiplexers).

The transmitter of the system of FIG. 2 includes a synthesis portion 20 with a synthesis bank. The synthesis bank comprises for 2M input low-rate sub-channel signals a dedicated up-conversion section with a conversion factor of M and a processing function $f_k(m)$, which constitutes the impulse response for a sub-channel filtering of a particular sub-channel. The index k of the function f indicates the respective sub-channel for which the function is provided, while the parameter m is a time index. The synthesis bank may, but does not have to be structured and operated exactly like the synthesis bank 10, 11 of FIG. 1.

The receiver of the system of FIG. 2 is part of some signal processing device 2 and includes an analysis portion 21 with an analysis bank. The analysis bank comprises for each of the 2M sub-channels a cosine-based processing function $h_k^c(m)$ followed by a down-conversion section with a conversion factor of M, outputting a respective in-phase signal. The analysis bank further comprises for each of the 2M sub-channels a sine-based processing function $h_k^s(m)$ followed by a down-conversion section with a conversion factor of M, outputting a respective quadrature signal. The indices k indicate again a respective sub-channel, while the parameter m is a time index. The analysis bank in the analysis portion 21 is implemented in the two-times oversampled form by taking the output signals in complex I/Q format. Oversampling makes it possible to perform the channel equalization within each sub-channel independently of the other sub-channels, that is, it enables a per-carrier equalization. A typical case with 100% roll-off, or lower, is assumed in the filter bank design so that the sub-band frequency range is twice the sub-band spacing and that two times oversampling is sufficient to keep all unwanted aliasing signal components below a level determined by the stopband attenuation. The analysis bank may, but does not have to be structured and operated exactly like the analysis bank 12-15 of FIG. 1.

In contrast to the system of FIG. 1, the I and Q outputs of the analysis portion 21 of FIG. 2 for each of the sub-channels are connected to a dedicated filter structure forming an equalizer 22, 23 for the respective sub-channel. The equalizers 22, 23 can be realized by hardware or software. The I and Q outputs of the analysis portion 21 are connected in addition to a channel estimation component 24, which has a controlling access to each of the equalizers 22, 23. For the sake of clarity, only a connection between the channel estimation component and one of the equalizers 22 is shown. The channel estimation component 24 can equally be realized by hardware or software.

Each equalizer 22, 23 comprises an assembly of amplitude and phase equalizers, in order to be able to compensate Inter-Carrier- and Inter-Symbol-Interferences. Non-ideal channels cause phase distortions, resulting in a rotation between real- and imaginary branches, and thus causing Inter-Carrier-Interference, while Inter-Symbol-Interference is caused mainly by amplitude distortion.

Figure 3:
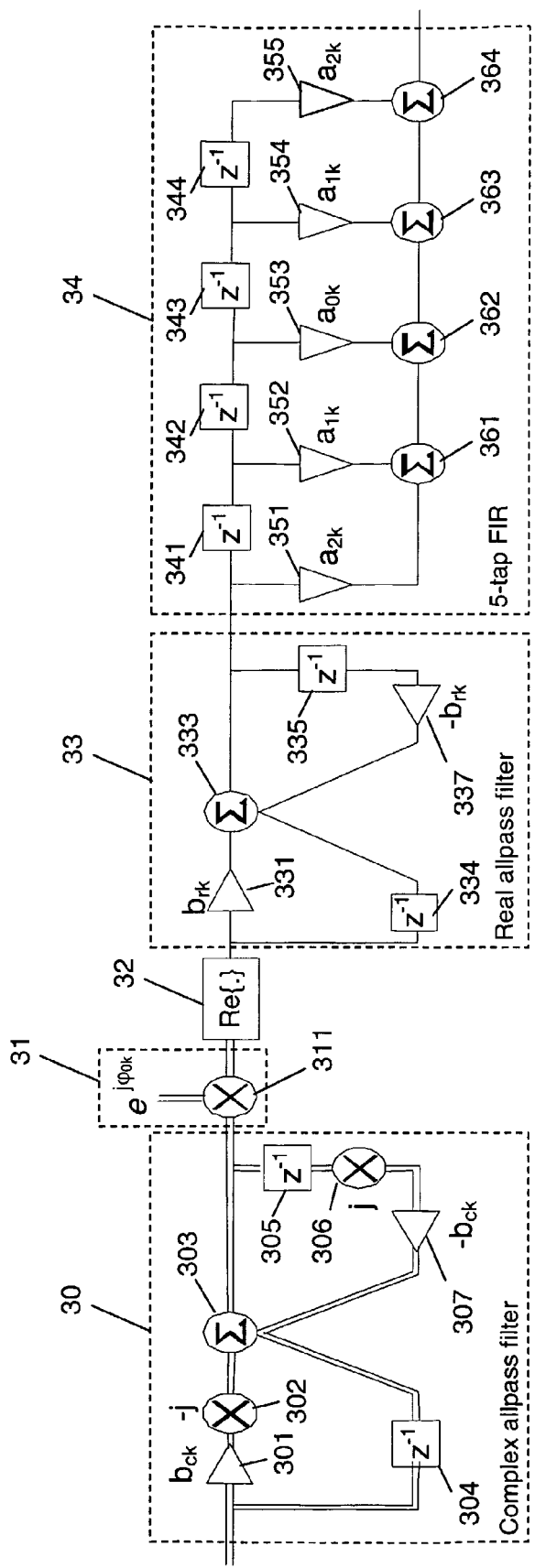
FIG. 3 is a schematic circuit diagram of an exemplary equalizer which can be used in the system of FIG. 2.

The structure of the equalizers 22, 13 is illustrated in more detail in FIG. 3.

Each equalizer 22, 23 comprises connected to the associated I and Q output of the analysis portion 21 a first order complex allpass filter 30. Both inputs to the complex allpass filter 30 are connected to an amplifying element 301 having an adjustable amplification factor of $b_{ck}$. The outputs of amplifying element 301 are connected via a multiplication element 302 multiplying the outputs of amplifying element 301 with −j and via a summing element 303 to the outputs of the complex allpass filter 30. The inputs to the complex allpass filter 30 are moreover connected via a delay element 304 to further inputs of summing element 303. The outputs of summing element 303 are moreover connected in a feedback loop via a further delay element 305, a multiplication element 306 multiplying the outputs of delay element 305 with j and an amplifying element 307 having an adjustable amplification factor of $-b_{ck}$ to further inputs of summing element 303. The transfer function of the complex allpass filter 30 is given by:

$$H_c(z) = \frac{1 - jb_c z}{1 + jb_c z^{-1}} \quad (1)$$

The complex output of the complex allpass filter 30 is processed by a phase rotator 31. The phase rotator 31 comprises an adjustable complex coefficient $e^{j\Phi_{0k}}$ and a multiplication element 311. The multiplication element 311 multiplies the output of the complex allpass filter 30 with the complex coefficient $e^{j\Phi_{0k}}$, which causes a phase rotation of the output of the complex allpass filter 30. A component 32 taking the real part Re{.} calculates the real part of the complex output of the phase rotator 31 and provides it to a first order real allpass filter 33.

The input to the real allpass filter 33 is connected to an amplifying element 331 having an adjustable amplification factor of $b_{rk}$. The output of amplifying element 331 is connected via a summing element 333 to the output of the real allpass filter 33. The input to the real allpass filter 33 is moreover connected via a delay element 334 to a further input of summing element 333. The output of summing element 333 is moreover connected in a feedback loop via a further delay element 335 and an amplifying element 337 having an adjustable amplification factor of $-b_{rk}$ to a further input of summing element 333. The transfer function of the real allpass filter 33 is given by:

$$H_r(z) = \frac{1 + b_r z}{1 + b_r z^{-1}} \quad (2)$$

In practice, the allpass filters 30, 33 are realized in the causal form as $z^{-1}H_x(z)$, but the above non-causal form simplifies the analysis.

The total phase response of the equalizer for the kth sub-channel is thus given by:

$$\arg[H_{peg}(e^{j\omega})] = \arg[e^{j\omega_{0k}} \cdot H_r(e^{j\omega}) \cdot H_c(e^{j\omega})] \quad (3)$$
$$= \varphi_{0k} + 2\arctan\left(\frac{b_{rk}\sin\omega}{1 + b_{rk}\cos\omega}\right) + 2\arctan\left(\frac{-b_{ck}\cos\omega}{1 + b_{ck}\sin\omega}\right)$$

The real allpass filter 33 is followed by a symmetric 5-tap FIR filter 34 as amplitude equalizer, which provides the output of the equalizer 22, 23.

The input of the FIR filter 34 is connected via a series connection of 4 delay elements 341, 342, 343, 344, an amplifying element 355 having an adjustable amplification factor of $a_{2k}$ and a summing element 364 to the output of the FIR filter 34. The input of the FIR filter 34 is further connected via an amplifying element 351 having an adjustable amplification factor of $a_{2k}$ and a series connection of summing elements 361, 362, 363, 364 to a further input of summing element 365. The output of delay element 341 is moreover connected via an amplifying element 352 having an adjustable amplification factor of $a_{1k}$ to a further input of summing element 361. The output of delay element 342 is moreover connected via an amplifying element 353 having an adjustable amplification factor of $a_{0k}$ to a further input of summing element 362. The output of delay element 343 is moreover connected via an amplifying element 354 having an adjustable amplification factor of $a_{1k}$ to a further input of summing element 363. The equalizer amplitude response for the $k^{th}$ sub-channel is given by:

$$|H_{aeq}(e^{j\omega})| = a_{0k} + 2a_{1k}\cos\omega + 2a_{2k}\cos 2\omega \quad (4)$$

The channel estimation component 24 has a controlling access to each of the equalizers 22, 23 for selecting the structure of the equalizers 22, 23 which is actually to be used by activating/deactivating some of the filter parts 30, 33, 34, as will be explained further below. Moreover, the channel estimation component 24 has a controlling access to each of the equalizers 22, 23 for setting the coefficients $\phi_{0k}$, $b_{ck}$, $b_{rk}$, $a_{0k}$, $a_{1k}$ and $a_{2k}$ required for the equalizer structure selected for the $k^{th}$ sub-channel.

For a transmission, 2M low-rate symbol sequences $I_k(m)$, $I_{2M-1-k}(m)$, which are to be transmitted on sub-channels k, 2M-1-k, are fed to the synthesis filter bank of the transmitting end, half of them corresponding to sub-channels between 0 and $f_s/2$, and the other half corresponding to sub-channels between 0 and $-f_s/2$, where $f_s$ is the high sampling rate. In the notation $I_k(m)$, $I_{2M-1-k}(m)$, the indices k, 2M-1-k indicate again a respective sub-channel, while the parameter m is a time index. The 2M sub-channel symbol sequences $I_k(m)$, $I_{2M-1-k}(m)$ are processed in the synthesis portion 20, transmitted via the radio interface, where they undergo a channel distortion h(m), the parameter m being again a time index, received by the receiver and processed by the analysis portion 21, e.g. as described above with reference to FIG. 1. The sub-channels k and 2M-1-k, which are located symmetrically with respect to the zero-frequency in the baseband model, are equally located symmetrically with respect to the radio frequency carrier frequency in the modulated signals.

The analysis portion outputs for each of the 2M sub-channels an in-phase component and a quadrature component, e.g. like in the system of FIG. 1 signals of a first, second, third and fourth group of low-rate sub-channel signals. The subsequent channel equalization, however, is not realized as in the system of FIG. 1 simply by multiplying the output of each sub-band filter with a fixed complex coefficient $c_k$, $s_k$.

Figure 4:
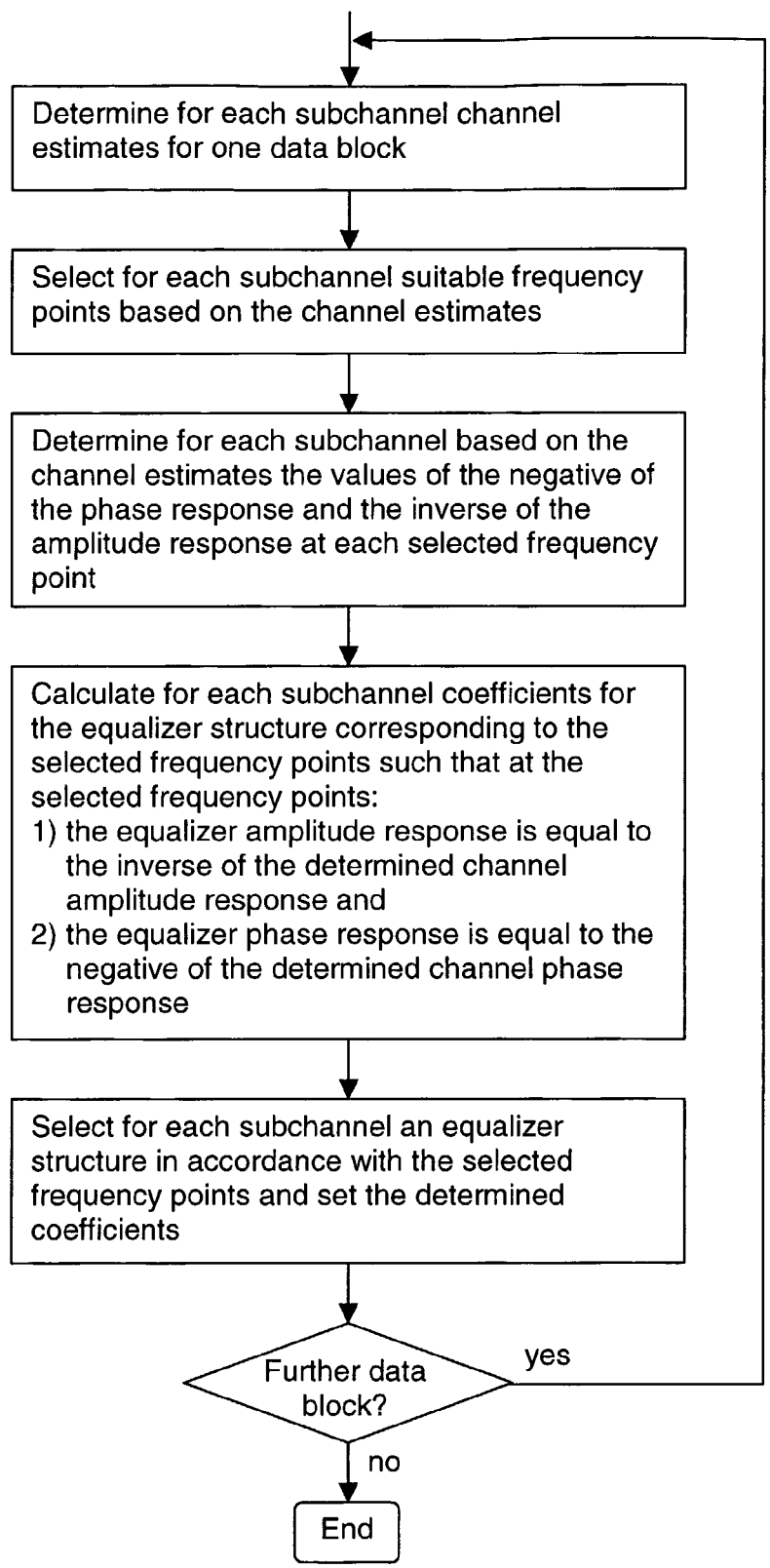
FIG. 4 is a flow chart illustrating the operation of a channel estimation component of the system of FIG. 2.

The channel equalization which is performed instead under control of the channel estimation component 24 will be described in the following with reference to the flow chart of FIG. 4.

The channel estimation component 24 receives for each of the 2M sub-channels the I and Q signals for one data block output by the analysis portion 21 and determines based on these signals the frequency domain channel estimates for each sub-channel.

The structure of each equalizer 22, 23 is now to be controlled such that it equalizes the associated sub-channel optimally at certain frequency points within the frequency band employed by the sub-channel. More specifically, at these frequency points, the equalizer amplitude response is to be equal to the inverse of the channel amplitude response, and the equalizer phase response is to be equal to the negative of the channel phase response.

The number of the considered frequency points determines the computational complexity and the required power consumption. Therefore, the channel estimation component 24 selects for each sub-channel the minimum number of frequency points which can be expected to result in a sufficient performance of the channel equalization. The selection is carried out data block wise based on the determined frequency domain channel estimates. The channel estimates can be determined for instance based on known pilot signals transmitted in all or some of the sub-channels from the transmitter to the receiver. Alternatively, a so-called blind method could be employed, which would not require pilot signals.

In a first case, the frequency domain channel estimates for a specific sub-channel indicate that a single frequency point located at the center frequency of a specific sub-channel, that is at $\omega=\pi/2$ at the low sampling rate, can be expected to result in a sufficient channel equalization. In this case, the associated equalizer 22, 23 only has to comprise a complex coefficient $e^{j\Phi_{0k}}$ for a phase rotation. The allpass filters 30, 33 are therefore omitted and the amplitude filter 34 of the equalizer structure of FIG. 3 is reduced to just one real coefficient as scaling amplification factor. In above equation (3) describing the equalizer phase response, this means that only the first term originating from the complex component $e^{j\Phi_{0k}}$ has to be considered. The equalizer amplitude response is constant.

In a second case, the frequency domain channel estimates for a specific sub-channel indicate that two frequency points located at the edges of the passband of a specific sub-channel, that is at $\omega=0$ and $\omega=\pm\pi$, can be expected to result in a sufficient channel equalization. The + sign is valid for odd sub-channels and the – sign is valid for even sub-channels. In this case, the associated equalizer 22, 23 has to comprise in addition to the complex coefficient $e^{j\Phi_{0k}}$ the first-order complex allpass filter 30 as phase equalizer, and a symmetric 3-tap FIR filter as amplitude equalizer. That is, compared to the equalizer structure of FIG. 3, the real allpass filter 33 is omitted and the length of the 5-tap FIR filter 34 is reduced from 5 to 3. In above equation (3) describing the equalizer phase response, this means that the middle term is omitted, and in above equation (4) describing the equalizer amplitude response, this means that the last term is omitted.

In a third case, the frequency domain channel estimates for a specific sub-channel indicate that three frequency points are required for a sufficient channel equalization. One frequency point is located at the center of the sub-channel frequency band, that is at $\omega=\pm\pi/2$, and two frequency points are located at the passband edges of the sub-channel, that is at $\omega=0$ and $\omega=\pm\pi$. The respective + sign is valid for even sub-channels and the respective – sign is valid for odd sub-channels. In this case, the associated equalizer 22, 23 has to comprise all components of the equalizer structure depicted in FIG. 3.

Optionally, further cases could be considered, in which the frequency domain channel estimates for a specific sub-channel indicate that additional frequency points at multiples of $\pi/4$ are expected to result in a better performance with a somewhat increased complexity. For such cases, the equalizer structure of FIG. 3 has to be adapted accordingly.

Once suitable frequency points have been selected for each sub-channel, the channel estimation component 24 determines for each sub-channel the coefficients which are required for the equalizer structure corresponding to the respectively selected frequency points.

For even sub-channels, the phase response values for up to three selected frequency points $\omega=0$, $\omega=\pi/2$ and $\omega=\pi$ are determined by the channel estimation component 24 to be:

$$arg[H_{ch}(e^{j\omega})]_{\omega=0}=\zeta_0$$

$$arg[H_{ch}(e^{j\omega})]_{\omega=\pi/2}=\zeta_1$$

$$arg[H_{ch}(e^{j\omega})]_{\omega=\pi}=\zeta_2 \quad (5)$$

For even sub-channels, moreover the inverse of the amplitude response values for up to three selected frequency points $\omega=0$, $\omega=\pi/2$ and $\omega=\pi$ are determined by the channel estimation component 24 to be:

$$\frac{1}{[H_{ch}(e^{j\omega})]_{\omega=0}}=\varepsilon_0 \quad (6)$$

$$\frac{1}{[H_{ch}(e^{j\omega})]_{\omega=\pi/2}}=\varepsilon_1$$

$$\frac{1}{[H_{ch}(e^{j\omega})]_{\omega=\pi}}=\varepsilon_2$$

For odd sub-channels, the phase response values for up to three selected frequency points at $\omega=-\pi$, $\omega=-\pi/2$ and $\omega=0$ are determined by the channel estimation component 24 to be:

$$arg[H_{ch}(e^{j\omega})]_{\omega=-\pi}=\zeta_0$$

$$arg[H_{ch}(e^{j\omega})]_{\omega=-\pi/2}=\zeta_1$$

$$arg[H_{ch}(e^{j\omega})]_{\omega=0}=\zeta_2 \quad (7)$$

For odd sub-channels, the inverse of the amplitude response values for three selected frequency points at $\omega=-\pi$, $\omega=-\pi/2$ and $\omega=0$ are determined by the channel estimation component 24 to be:

$$\frac{1}{[H_{ch}(e^{j\omega})]_{\omega=-\pi}}=\varepsilon_0 \quad (8)$$

$$\frac{1}{[H_{ch}(e^{j\omega})]_{\omega=-\pi/2}}=\varepsilon_1$$

$$\frac{1}{[H_{ch}(e^{j\omega})]_{\omega=0}}=\varepsilon_2$$

If the right hand term of equation (3) is set equal for each frequency point to the negative value of the right hand term of the corresponding one of equations (5) and (7), and if the right hand term of equation (4) is set equal for each frequency point to the right hand term of the corresponding one of equations (6) and (8), the coefficients $\phi_{0k}$, $\beta_{ck}$, $\beta_{rk}$, $\alpha_{0k}$, $\alpha_{1k}$, $\alpha_{2k}$ of the filter structure of FIG. 3 can be calculated as:

$$\varphi_{0k}=-\frac{\zeta_{0k}+\zeta_{2k}}{2} \qquad a_{0k}=\frac{1}{8}(2\varepsilon_{0k}+4\varepsilon_{1k}+2\varepsilon_{2k}) \quad (9)$$

$$b_{ck}=\pm\tan\left(\frac{\zeta_{0k}-\zeta_{2k}}{4}\right) \qquad a_{1k}=\pm\frac{1}{8}(2\varepsilon_{0k}-2\varepsilon_{2k})$$

$$b_{rk}=\pm\tan\left(\frac{-\zeta_{1k}-\varphi_{0k}}{2}\right) \qquad a_{2k}=\frac{1}{8}(\varepsilon_{0k}-2\varepsilon_{1k}+\varepsilon_{2k})$$

In these coefficients, the + signs apply again for the even sub-channels and the – signs for the odd sub-channels.

In the case of only two frequency points, the part for the real allpass filter in equation (9) has to be omitted, while coefficients for the phase rotator and for the complex allpass filter can be determined as in equations (9). The amplitude equalizer coefficients can be calculated in this case as:

$$a_{0k}=\frac{1}{2}(\varepsilon_{0k}+\varepsilon_{2k}) \quad (10)$$

$$a_{1k}=\frac{1}{4}(\varepsilon_{0k}-\varepsilon_{2k})$$

In the case of one frequency point, for the phase only the coefficient for the phase rotator in equations (9) is relevant. For the amplitude equalizer, $a_{0k}$ is set in this case to $\epsilon_{1k}$.

The channel estimation component 24 calculates for each sub-channel according to equations (9) and/or (10) the coefficients required for the equalizer structure corresponding to the frequency points selected for the current data block for the respective sub-channel.

The channel estimation component 24 then selects for each sub-channel a structure for the equalizers 22, 23 in accordance with the selected frequency points. The selection may consist for each sub-channel in activating the required filter parts in a single comprehensive equalizer structure as depicted in FIG. 3, or in choosing one of several equalizer structures available for each equalizer 22, 23. Finally, the channel estimation component 24 sets all required coefficients in the selected equalizer structures as determined.

As long as further data blocks are provided by the analysis portion 21, the procedure of determining frequency domain channel estimates, determining required frequency points, calculating required coefficients, selecting equalizer structures, and setting the required coefficients is repeated.

The equalizers 22, 23 having the selected structure compensate in each signal output by the analysis portion 21 the effects of fading and frequency selectivity in the respective sub-channel on the radio interface.

After this channel equalization, the filtered signals are subjected to a respective slicer (not shown), in order to obtain the restored 2M sub-channel symbol sequences $\hat{I}_k(m)$, $\hat{I}_{2M-1-k}(m)$. In the notation $\hat{I}_k(m)$ $\hat{I}_{2M-1-k}(m)$, the indices k, 2M-1-k indicate again the respective sub-channel, while the parameter m is again a time index.

Compared to the $0^{th}$ order ASCET of FIG. 1, the proposed system has a better performance for a given number of sub-channels, or enables a reduction of sub-channels for a given performance, since the channel response of a sub-channel is not assumed to be a constant value. Compared to known higher-order ASCETs or to an approach using a polynomial frequency response model, the proposed system is less complex, since no modeling step is required.

It has to be noted that there are various possibilities to order the components of the equalizers 22, 23 without effecting the overall response.

It has moreover to be noted that instead of the presented first-order phase equalizer, equally higher order phase equalizers may be used. The phase equalizer may include for example several real allpass filters and complex allpass filters in cascade, possibly including second-order filters. Also the length of the amplitude equalizer can be selected arbitrarily.

Further, it is to be understood that the described embodiment constitutes only one of a variety of possible embodiments of the invention.

The invention claimed is:

1. A method for use in an equalization of a channel by means of an equalizer, wherein said channel uses a certain frequency band for a transfer of signals, said method comprising:

determining, by a signal processing apparatus, a channel response for at least three frequency points within said frequency band used by said channel; and setting, by a signal processing apparatus, adjustable coefficients of said equalizer such that an equalizer response compensates the determined channel response at said at least three frequency points;

wherein determining said channel response comprises determining a channel phase response and a channel amplitude response for said channel;

wherein said adjustable coefficients of said equalizer are set such that an equalizer amplitude response approaches an inverse of a determined channel amplitude response for all considered frequency points and that an equalizer phase response approaches a negative of a determined channel phase response for all considered frequency points; and wherein said setting of adjustable coefficients comprises for an equalization of phase of said channel setting a complex coefficient as a phase rotator part of said equalizer, setting at least one coefficient of a non-real complex allpass filter part of said equalizer, and setting at least one coefficient of a real allpass filter part of said equalizer.

2. The method according to claim 1, further comprising selecting, by a signal processing apparatus, a number of said at least three frequency points for said channel to correspond to a minimum number which can be expected to result in a sufficient channel equalization.

3. The method according to claim 2, wherein said number of said at least three frequency points is selected for said channel data block-wise based on frequency domain channel estimates for said channel.

4. The method according to claim 1, wherein setting said adjustable coefficients comprises for an equalization of amplitude of said channel setting at least one coefficient of a symmetric 5-tap Finite Impulse Response filter part of said equalizer.

5. Use of the method according to claim 1 for a single channel of a single carrier system.

6. Use of the method according to claim 1 for each of a plurality of sub-channels of a filter bank based multicarrier system or of a transform based multicarrier system.

7. Use of the method according to claim 1 for each of a plurality of sub-channels of a filter bank based multiantenna system or of a transform based multiantenna system in a Multiple Input Multiple Output configuration.

8. Use of the method according to claim 1 for channels which are to be processed in an analysis-synthesis filter bank configuration.

9. An apparatus comprising:

at least one equalizer associated to a channel using a certain frequency band for a transfer of signals, which at least one equalizer comprises adjustable coefficients; and a channel estimation component configured to determine for at least one channel to which said at least one equalizer is associated a channel response for at least three frequency points within a frequency band used by said at least one channel, and configured to set adjustable coefficients of said at least one equalizer such that an equalizer response compensates a determined channel response at said at least three frequency points;

wherein said channel estimation component is configured to determine as said channel response for said at least one channel a channel phase response and a channel amplitude response, and to set said coefficients of said equalizer such that an equalizer amplitude response approaches an inverse of a determined channel amplitude response for all considered frequency points and that an equalizer phase response approaches a negative of a determined channel phase response for all considered frequency points;

wherein said at least one equalizer comprises for an equalization of phase of said at least one channel a phase rotator part with an adjustable complex coefficient which is configured to be set by said channel estimation component, a non-real complex allpass filter part with at least one coefficient which is configured to be set by said channel estimation component, and a real allpass filter part with at least one coefficient which is configured to be set by said channel estimation component; and wherein at least one of said at least one equalizer and said channel estimation component is implemented at least partly in hardware.

10. The apparatus according to claim 9, wherein said channel estimation component is further configured to select a number of said at least three frequency points for said at least one channel such that it corresponds to a minimum number which can be expected to result in a sufficient channel equalization.

11. The apparatus according to claim 10, wherein said channel estimation component is configured to select said number of said at least three frequency points for said at least one channel data block-wise based on frequency domain channel estimates for said at least one channel.

12. The apparatus according to claim 9, wherein said at least one equalizer comprises for an equalization of amplitude of said at least one channel a symmetric 5-tap Finite Impulse Response filter part with at least one coefficient which is configured to be set by said channel estimation component.

13. The apparatus according to claim 9, wherein said at least one equalizer is a single equalizer configured to equalize a single channel of a single carrier system.

14. The apparatus according to claim 9, wherein said at least one equalizer comprises a plurality of equalizers, each configured to equalize another one of a plurality of sub-channels of a filter bank based multicarrier system or of a transform based multicarrier system.

15. The apparatus according to claim 9, wherein said at least one equalizer comprises a plurality of equalizers, and wherein a respective matrix of equalizers is configured to equalize another one of a plurality of sub-channels of a filter bank based multiantenna system or of a transform based multiantenna system in a Multiple Input Multiple Output configuration.

16. The apparatus according to claim 9 comprising an analysis-synthesis filter bank, wherein said at least one equalizer comprises a plurality of equalizers, each configured to equalize another one of a plurality of sub-channels which are to be processed by said analysis-synthesis filter bank.

17. A signal processing system comprising a signal processing device with:
at least one equalizer associated to a channel using a certain frequency band for a transfer of signals, which at least one equalizer comprises adjustable coefficients; and
a channel estimation component configured to determine for at least one channel to which said at least one equalizer is associated a channel response for at least one frequency point within a frequency band used by said at least one channel, and configured to set adjustable coefficients of said at least one equalizer such that an equalizer response compensates optimally a determined channel response at said at least one selected frequency point;
wherein said channel estimation component is configured to determine as said channel response for said at least one channel a channel phase response and a channel amplitude response, and to set said coefficients of said equalizer such that an equalizer amplitude response approaches an inverse of a determined channel amplitude response for all considered frequency points and that an equalizer phase response approaches a negative of a determined channel phase response for all considered frequency points;

wherein said at least one equalizer comprises for an equalization of phase of said at least one channel a phase rotator part with an adjustable complex coefficient which is configured to be set by said channel estimation component, a non-real complex allpass filter part with at least one coefficient which is configured to be set by said channel estimation component, and a real allpass filter part with at least one coefficient which is configured to be set by said channel estimation component; and wherein at least one of said at least one equalizer and said channel estimation component is implemented at least partly in hardware.

18. The signal processing system according to claim 17, wherein said channel estimation component is further configured to select a number of said at least three frequency points for said at least one channel such that it corresponds to a minimum number which can be expected to result in a sufficient channel equalization.

19. The signal processing system according to claim 18, wherein said channel estimation component is configured to select said number of said at least one frequency point for said at least one channel data block-wise based on frequency domain channel estimates for said at least one channel.

20. The signal processing system according to claim 17, wherein said at least one equalizer comprises for an equalization of amplitude of said at least one channel a symmetric 5-tap Finite Impulse Response filter part with at least one coefficient which is configured to be set by said channel estimation component.

21. The signal processing system according to claim 17, wherein said system is a single carrier system and wherein said at least one equalizer is a single equalizer configured to equalize a single channel.

22. The signal processing system according to claim 17, wherein said system is a filter bank based multicarrier system and wherein said at least one equalizer comprises a plurality of equalizers, each configured to equalize another one of a plurality of sub-channels of said filter bank based multicarrier system.

23. The signal processing system according to claim 17, wherein said system is a filter bank based or transform based multiantenna system in a Multiple Input Multiple Output configuration, wherein said at least one equalizer comprises a plurality of equalizers, and wherein a respective matrix of equalizers is configured to equalize another one of a plurality of sub-channels of said filter bank based or transform based multiantenna system.

24. The signal processing system according to claim 17, wherein said system is an analysis-synthesis filter bank system, wherein said at least one equalizer comprises a plurality of equalizers, each configured to equalize another one of a plurality of sub-channels which are to be processed by said analysis-synthesis filter bank system.

25. A non-transitory computer readable medium in which a software code is stored as an equalizer for use in an equalization of a channel, wherein said channel uses a certain frequency band for a transfer of signals, said software code for execution when running in a signal processing device comprising said equalizer configured to cause an apparatus to:
determine a channel response for at least three frequency points within said frequency band used by said channel; and
set at least one adjustable coefficient of said equalizer such that an equalizer response compensates the determined channel response at said at least three frequency points;

wherein to determine said channel response comprises to determine a channel phase response and a channel amplitude response for said channel;

wherein said adjustable coefficients of said equalizer are set such that an equalizer amplitude response approaches an inverse of a determined channel amplitude response for all considered frequency points and that an equalizer phase response approaches a negative of a determined channel phase response for all considered frequency points; and wherein to set said at least one adjustable coefficient comprises for an equalization of phase of said channel to set a complex coefficient as a phase rotator part of said equalizer, to at least one coefficient of a non-real complex allpass filter part of said equalizer, and to set at least one coefficient of a real allpass filter part of said equalizer.

* * * * *

UNITED STATES PATENT AND TRADEMARK OFFICE
CERTIFICATE OF CORRECTION

| | | |
|---|---|---|
| PATENT NO. | : 7,936,851 B2 | Page 1 of 1 |
| APPLICATION NO. | : 10/590039 | |
| DATED | : May 3, 2011 | |
| INVENTOR(S) | : Markku Renfors et al. | |

It is certified that error appears in the above-identified patent and that said Letters Patent is hereby corrected as shown below:

In the ABSTRACT, line 9, "(" should be deleted.

In column 14, line 13 (claim 2, line 2), "a" should be --said--.

In column 18, line 4 (claim 25, line 26), --set-- should be inserted after "to".

Signed and Sealed this
Fifth Day of July, 2011

David J. Kappos
*Director of the United States Patent and Trademark Office*